United States Patent
Zhang et al.

(10) Patent No.: US 12,429,351 B2
(45) Date of Patent: Sep. 30, 2025

(54) ROUTE DISPLAY METHOD AND RELATED APPARATUS

(71) Applicant: Tencent Technology (Shenzhen) Company Limited, Shenzhen (CN)

(72) Inventors: Long Zhang, Shenzhen (CN); Ming Yang, Shenzhen (CN); Ming He, Shenzhen (CN); Xueshu Zhao, Shenzhen (CN); Zhongzhen Pan, Shenzhen (CN); Fanrong Meng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 253 days.

(21) Appl. No.: 17/978,109

(22) Filed: Oct. 31, 2022

(65) Prior Publication Data

US 2023/0066461 A1 Mar. 2, 2023

Related U.S. Application Data

(63) Continuation of application No. PCT/CN2021/122536, filed on Oct. 8, 2021.

(30) Foreign Application Priority Data

Oct. 30, 2020 (CN) .......................... 202011189857.4

(51) Int. Cl.
*G01C 21/36* (2006.01)
(52) U.S. Cl.
CPC ....... *G01C 21/3694* (2013.01); *G01C 21/362* (2013.01)
(58) Field of Classification Search
CPC .................... G01C 21/3694; G01C 21/362
See application file for complete search history.

(56) References Cited

U.S. PATENT DOCUMENTS

| | | | |
|---|---|---|---|
| 8,131,461 B2 * | 3/2012 | Chuang .............. | G01C 21/3632 340/995.19 |
| 8,606,510 B2 * | 12/2013 | Lin ...................... | G08G 1/0969 701/411 |

(Continued)

FOREIGN PATENT DOCUMENTS

| | | |
|---|---|---|
| CN | 105300399 A | 2/2016 |
| CN | 106052709 A | 10/2016 |

(Continued)

OTHER PUBLICATIONS

Tencent Technology, WO, PCT/CN2021/122536, Jan. 6, 2022, 5 pgs.

(Continued)

*Primary Examiner* — Anil K Bhargava
(74) *Attorney, Agent, or Firm* — Morgan, Lewis & Bockius LLP

(57) ABSTRACT

This application provides a route display method performed by a computer device. When a route planning request for a route planning mode is obtained from a terminal device, a corresponding route planning result and original interpretation data involved in the current route planning result are determined; a route interpretation scenario corresponding to the original interpretation data and the route planning mode are used to query a corresponding target interpretation template; and a target interpretation element that needs to be displayed when the route planning result is displayed in an electronic map on the terminal device is determined through the target interpretation template, to explain the route planning result by using the target interpretation element. Such a manner of interpreting templates can store, query, modify and synchronize the interpretation templates through a database, so that combinations of various route planning modes (Continued)

and route interpretation scenarios can be decoupled from each other.

15 Claims, 10 Drawing Sheets

(56) References Cited

U.S. PATENT DOCUMENTS

| | | | | |
|---|---|---|---|---|
| 9,212,920 | B1* | 12/2015 | Mannepalli | G08G 1/09685 |
| 9,909,886 | B2* | 3/2018 | Gearhart | G01C 21/3407 |
| 11,768,077 | B2* | 9/2023 | Hajj | G01C 21/3667 |
| | | | | 701/428 |
| 11,788,851 | B2* | 10/2023 | Kim | G01C 21/3697 |
| | | | | 701/423 |
| 2005/0090974 | A1* | 4/2005 | Hirose | G01C 21/3691 |
| | | | | 340/995.13 |
| 2009/0259393 | A1* | 10/2009 | Chuang | G01C 21/3632 |
| | | | | 701/533 |
| 2009/0265092 | A1* | 10/2009 | Lin | G08G 1/096894 |
| | | | | 345/173 |
| 2010/0036605 | A1* | 2/2010 | Lee | G01C 21/3415 |
| | | | | 701/533 |
| 2014/0309927 | A1* | 10/2014 | Ricci | G06Q 30/00 |
| | | | | 701/424 |
| 2016/0076896 | A1* | 3/2016 | König | G06F 16/29 |
| | | | | 701/411 |
| 2016/0232785 | A1* | 8/2016 | Wang | G08G 1/0129 |
| 2017/0052654 | A1* | 2/2017 | Cervelli | G06F 16/29 |
| 2017/0284821 | A1* | 10/2017 | Yen | H04L 67/52 |
| 2018/0101236 | A1 | 4/2018 | Aoyama et al. | |
| 2020/0370897 | A1* | 11/2020 | Tajammul | G06F 9/451 |
| 2020/0372012 | A1* | 11/2020 | Averbuch | G06F 16/2379 |
| 2021/0174669 | A1* | 6/2021 | Guan | G06N 3/08 |
| 2021/0223056 | A1* | 7/2021 | Zhang | G01C 21/343 |
| 2022/0146271 | A1* | 5/2022 | Hajj | G08G 1/0125 |

FOREIGN PATENT DOCUMENTS

| | | | |
|---|---|---|---|
| CN | 106643772 | A | 5/2017 |
| CN | 107664502 | A | 2/2018 |
| CN | 109859609 | A | 6/2019 |
| CN | 111486861 | A | 8/2020 |
| CN | 111489553 | A | 8/2020 |
| CN | 112325899 | A | 2/2021 |
| JP | 2003172628 | A | 6/2003 |
| JP | 2005077300 | A | 3/2005 |
| JP | 2005321356 | A | 11/2005 |
| JP | 2007064914 | A | 3/2007 |
| JP | 2011069697 | A | 4/2011 |
| JP | 2014132227 | A | 7/2014 |
| JP | 2016066217 | A | 4/2016 |
| JP | 2018063552 | A | 4/2018 |
| WO | WO-2016047064 | A1 * | 3/2016 ........... G06F 3/1203 |

OTHER PUBLICATIONS

Tencent Technology, IPRP, PCT/CN2021/122536, May 2, 2023, 6 pgs.
Tencent Technology, ISR, PCT/CN2021/122536, Jan. 6, 2022, 2 pgs.
Tencent Technology, Extended European Search Report, EP Patent Application No. 21884891.9, Jun. 4, 2024, 14 pgs.
Tencent Technology, European Office Action, EP Patent Application No. 21884891.9, Aug. 1, 2023, 3 pgs.

* cited by examiner

ROUTE DISPLAY METHOD AND RELATED APPARATUS

CROSS-REFERENCE TO RELATED APPLICATIONS

This application is a continuation application of PCT Patent Application No. PCT/CN2021/122536, entitled "PATH DISPLAY METHOD AND RELATED APPARATUS" filed on Oct. 8, 2021, which claims priority to Chinese Patent Application No. 202011189857.4, filed with the State Intellectual Property Office of the People's Republic of China on Oct. 30, 2020, and entitled "ROUTE DISPLAY METHOD AND RELATED APPARATUS", all of which are incorporated herein by reference in their entirety.

FIELD OF THE TECHNOLOGY

This application relates to the field of electronic maps, and in particular, to a route display technology in the electronic maps.

BACKGROUND OF THE APPLICATION

Route planning is a basis of electronic map navigation and is also one of the most important core functions in an electronic map. Route planning is generally defined as finding one or more routes from a designated starting point to a designated end point. In addition to performing route planning on a homepage of the map, a new route planning request will be triggered in various route planning modes such as yawing, main and side road switching, user preference changing, and via point adding or removing in navigation. When a route planning result calculated in response to the route planning request is obtained, the route planning result may be displayed through the electronic map.

When the route planning result is displayed, the route planning result needs to be explained correspondingly to answer a user's possible confusion about the current route planning result, for example, "Why is a familiar route not recommended this time?", "Why is the route recommended this time a bit detoured?" and other questions. That is, when the route planning result is displayed, a reason for recommending the route planning result is displayed correspondingly to eliminate user confusion.

With the development of electronic maps, the foregoing route interpretation scenarios are becoming more and more abundant, for example, road restrictions, avoiding road closures, or the like. In addition, newly added route interpretation scenarios also need to be compatible with different route planning modes, which will cause a large number of combinations of route interpretation scenarios and route planning modes to be newly added.

In the related art, to implement the route interpretation scenarios in the electronic map, a hard-coding manner is needed, that is, every time a route interpretation scenario is newly added, a server and a terminal device need to update protocol data based on the newly added route interpretation scenario and a large number of related combinations. Not only code logic is complex, but a version cannot be released until each implements internal logic iteration, and overall iteration efficiency is very low.

SUMMARY

To resolve the foregoing technical problems, this application provides a route display method and a related apparatus, which can simplify code logic and improve iteration efficiency.

Embodiments of this application disclose the following technical solutions:

according to a first aspect, an embodiment of this application provides a route display method, performed by a server, the method including:
determining a corresponding route planning result and original interpretation data according to a route planning request for a route planning mode, the route planning mode being used for identifying a reason for initiating the route planning request;
determining a corresponding target interpretation template according to the route planning mode and a route interpretation scenario corresponding to the original interpretation data;
determining element information according to the original interpretation data and the target interpretation template, the element information including an element identifier of a target interpretation element corresponding to the route planning result; and
transmitting the element information to the terminal device, the element identifier in the element information being used for instructing the terminal device to display the target interpretation element when the terminal device displays the route planning result.

According to a second aspect, an embodiment of this application provides a route display method, performed by a terminal device, the method including:
transmitting a route planning request for a route planning mode to a server, the route planning mode being used for identifying a reason for initiating the route planning request;
obtaining element information returned by the server, the element information including an element identifier, the element identifier being used for instructing to display a target interpretation element when the terminal device displays a route planning result;
determining the target interpretation element from a locally-saved interpretation resource pool according to the element identifier included in the element information; and
displaying the target interpretation element when a route planning result corresponding to the route planning request is displayed.

According to a third aspect, an embodiment of this application provides a route display apparatus, the apparatus including: a first determining unit, a second determining unit, a third determining unit and a fourth determining unit;
the first determining unit being configured to determine a corresponding route planning result and original interpretation data according to a route planning request for a route planning mode, the route planning mode being used for identifying a reason for initiating the route planning request;
the second determining unit being configured to determine a corresponding target interpretation template according to the route planning mode and a route interpretation scenario corresponding to the original interpretation data;
the third determining unit being configured to determine element information according to the original interpretation data and the target interpretation template, the element information including an element identifier of a target interpretation element corresponding to the route planning result; and
the fourth determining unit being configured to transmit the element information to the terminal device, the element identifier in the element information being used for instructing the terminal device to display the target interpretation element when the terminal device displays the route planning result.

According to a fourth aspect, an embodiment of this application provides a route display apparatus, the apparatus including: a transmitting unit, an obtaining unit, a determining unit and a display unit:

the transmitting unit being configured to transmit a route planning request for a route planning mode to a server, the route planning mode being used for identifying a reason for initiating the route planning request;

the obtaining unit being configured to obtain element information returned by the server, the element information including an element identifier, the element identifier being used for instructing to display a target interpretation element when the terminal device displays a route planning result;

the determining unit being configured to determine the target interpretation element from a locally-saved interpretation resource pool according to the element identifier included in the element information; and the display unit being configured to display the target interpretation element when a route planning result corresponding to the route planning request is displayed.

According to a fifth aspect, an embodiment of this application provides a computer device, the device including a processor and a memory:

the memory being configured to store program code and transmit the program code to the processor; and the processor being configured to perform the method described in the foregoing first aspect or the second aspect according to instructions in the program code.

According to a sixth aspect, an embodiment of this application provides a non-transitory computer-readable storage medium, the computer-readable storage medium being configured to store a computer program, the computer program being configured to perform the method described in the foregoing first aspect or the second aspect.

According to a seventh aspect, an embodiment of this application provides a computer program product or a computer program, the computer program product or the computer program including computer instructions, the computer instructions being stored in a computer-readable storage medium. A processor of a computer device reads the computer instructions from the computer-readable storage medium, and the processor executes the computer instructions, to cause the computer device to perform the method described in the foregoing first aspect or the second aspect.

According to an eighth aspect, an embodiment of this application provides a route display system, the system including a terminal device and a server, the server being configured to perform the method described in the foregoing first aspect, and the terminal device being configured to perform the method described in the foregoing second aspect.

It can be seen from the foregoing technical solutions that when the route planning request for the route planning mode is obtained, the corresponding route planning result and the original interpretation data that may be involved in the current route planning result can be determined, the route interpretation scenario corresponding to the original interpretation data and the route planning mode are used as query words to query the corresponding target interpretation template, and the target interpretation element that needs to be displayed when the terminal device displays the route planning result can be determined through the target interpretation template, where the target interpretation element may be configured to explain the route planning result. The foregoing interpretation templates decouple combinations of various route planning modes and route interpretation scenarios from each other, so that maintenance and update may be independently performed, a hard-coding stage in related art is eliminated, only interpretation templates corresponding to the combinations need to be added when route interpretation scenarios are newly added when route interpretation scenarios are newly added, and each independent interpretation template is also easier to update and maintain. Moreover, even for a new route interpretation scenario, the terminal device can complete display of the interpretation element only based on instruction of the element information, which no longer requires cumbersome coding debugging and logic iteration, freeing up processing resources of the terminal device.

DESCRIPTION OF EMBODIMENTS

Figure 1:
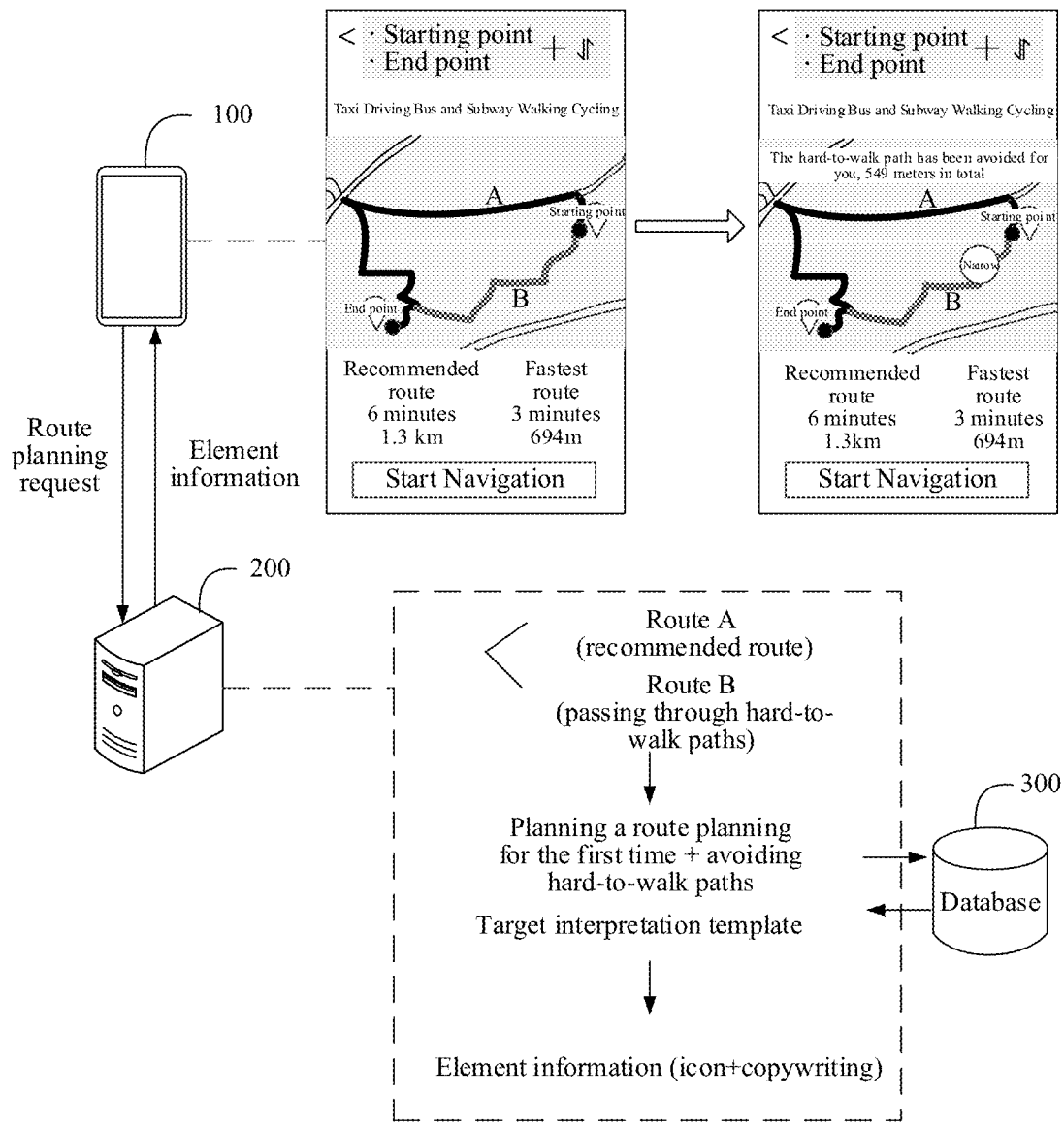
FIG. 1 is a schematic diagram of an application scenario of a route display method according to an embodiment of this application.

The following describes embodiments of this application with reference to the accompanying drawings.

In the related art, when a route is displayed in an electronic map, different combinations of route planning modes and route interpretation scenarios correspond to different code logic. With continuous increase of the route interpretation scenarios and the route planning modes, the code logic corresponding to the combinations of the two will become more and more complex. A current manner of displaying a route through hard coding is not conducive to code maintenance and updating. When a route interpretation scenario or a route planning mode is newly added, both a server and a terminal device need to modify or add relevant protocol data, then respectively iterate internal logic, and finally jointly debug and distribute a release. The overall iteration efficiency is lower.

To reduce complexity of code logic and improve the iteration efficiency, the embodiments of this application provide a route display method and a related apparatus.

The route display method provided in the embodiments of this application may be applied to an electronic device with route calculation, processing, and display capabilities, such as a server or a terminal device. The method may be independently performed by the server, or independently performed by the terminal device, and may further be applied to a network scenario in which the terminal device is in communication with the server, and is performed by the terminal device and the server in a cooperation manner. The terminal device may be a smartphone, a notebook computer, a desktop computer, an in-vehicle computer, a personal digital assistant (PDA), a tablet computer, or other devices. The server may be an application server or a Web server. In actual deployment, the server may be an independent physical server, may be a server cluster or distributed system including a plurality of physical servers, or may be a cloud server providing cloud computing services. The terminal and the server may be directly or indirectly connected in a wired or wireless communication manner. This is not limited in this application.

In addition, the technical solutions provided in this application further relate to the field of cloud technologies, such as a database and other fields.

The database, in short, may be considered as an electronic file cabinet, that is, a place for storing electronic files. A user may perform operations such as adding, querying, updating, or deleting data in the files. The so-called "database" is a data set that is stored together in a particular manner and can be shared with a plurality of users, has as little redundancy as possible, and is independent of an application.

A database management system (DBMS for short) is a computer software system designed for managing a database, generally having basic functions such as storage, interception, security assurance, and backup. The database management system may use a database model it supports for classification, such as a relational expression and an extensible markup language (XML); or perform classification based on a supported computer type, such as a server cluster and a mobile phone; or perform classification according to a used query language, such as a structured query language (SQL) and Xquery; or perform classification according to a performance impulse focus, such as a maximum size and a maximum operating speed; or perform classification in another manner. Regardless of the classification manner used, some DBMSs support cross-category, for example, simultaneously supporting a plurality of query languages.

In the embodiments of this application, an interpretation template is stored, queried, modified and synchronized through the database.

To facilitate understanding of the technical solutions of this application, the following describes, with reference to actual application scenarios, the route display method provided in the embodiments of this application.

Referring to FIG. 1, FIG. 1 is a schematic diagram of an application scenario of a route display method according to an embodiment of this application. As shown in FIG. 1, a terminal device 100 and a server 200 are included. In this embodiment, mainly taking an example in which the route display method provided in the embodiment of this application is executed by the server 200, a scenario-based introduction is given to the route display method.

The server 200 receives a route planning request for a route planning mode transmitted by the terminal device 100. The route planning mode is used for identifying a reason for initiating the route planning request. For example, a new route planning request will be triggered due to various initiation reasons such as yawing, main and side road switching, user preference changing, and via point adding or removing in navigation.

The server 200 determines a corresponding route planning result and original interpretation data according to the route planning request for the route planning mode. The server 200 may calculate a corresponding route planning result based on a starting point and an end point in the route planning request. The route planning result includes a planned route from the starting point to the end point. The original interpretation data is interpretation data that may be involved in the planned route, including a corresponding route interpretation scenario; For example, the route interpretation scenario may be whether the planned route avoids congestion, passes through mountain roads, avoids mountain roads, avoids road closures, avoids hard-to-walk paths, or the like. As shown in FIG. 1, from a starting point to an end point of this route planning, taking driving as a travel mode, a determined route planning result includes two routes, respectively being a route A that takes 6 minutes to travel 1.3 km, and a route B that takes 3 minutes to travel 694 m. Since the route B passes through hard-to-walk paths, the route A is a recommended route, and the route B is an additional reference route.

As mentioned above, since the route planning mode may reflect a reason for initiating the route planning request, for the same starting point and end point, different route planning results may be determined based on different route planning modes. For example, different user preferences, via point modification, and the like will result in different routes being included in the route planning result. Different route planning results may require interpretation elements (corresponding to route interpretation scenario) of different types to explain reasons for such planning.

Further, even if a same route interpretation scenario is determined based on the route planning result, interpretation elements that actually need to be displayed in different route planning modes may be different. For example, for the same route interpretation scenario, an interpretation element displayed during identification of performing route planning for the first time may also be different from an interpretation element displayed in the route planning mode in navigation.

Thus, a corresponding interpretation template may be defined based on a combination of the route planning mode and the route interpretation scenario, and display rules and demands of the interpretation element under different combinations may be determined through the interpretation template.

Thus, the server 200 may determine a target interpretation template corresponding to the combination of the route planning mode and the route interpretation scenario based on the route planning mode and the route interpretation scenario corresponding to the original interpretation data. For example, in the scenario shown in FIG. 1, the route planning mode is first-time route planning, and the route interpretation scenario corresponding to the original interpretation data is avoiding hard-to-walk paths. The server 200 may use avoiding hard-to-walk paths and first-time route planning as query words, and query the database 300 for the target interpretation template corresponding to the combination mode.

The server 200 determines element information according to the original interpretation data and the target interpretation template, and sends the element information to the terminal device 100 as an explanation for the determined route planning result. The element information includes an element identifier corresponding to the target interpretation element of the route planning result. The element identifier is used for instructing to display the target interpretation element when the terminal device 100 displays the route planning result. For example, there is a hard-to-walk path of 549 m on the route B. The target interpretation element is an element identifier for interpreting the hard-to-walk path. When the route planning result is displayed, an icon corresponding to the hard-to-walk path (the character "narrow" in a circle), copywriting (the hard-to-walk path has been avoided for you, 549 meters in total), and the like, will be displayed on the route B. Therefore, it is convenient for the user of the terminal device 100 to understand the reason why the recommended route of the current route planning result is the route A, and the route B is used as an additional reference route. Thus, the terminal device 100 receives the element information transmitted by the server 200 and displays the element information correspondingly at a position corresponding to the route planning result. Even for a new route interpretation scenario, the terminal device 100 can complete display of the interpretation element only based on instruction of the element information, which no longer requires cumbersome coding debugging and logic iteration, freeing up processing resources of the terminal device 100.

For different combinations of the route planning modes and the route interpretation scenarios, the technical solutions of this application no longer implement corresponding code logic in a hard-coding manner, but pre-store different combinations in the form of different interpretation templates, so that the combinations of various route planning modes and route interpretation scenarios are decoupled from each other, thereby independently maintaining and updating. In addition, if a route interpretation scenario is newly added, only interpretation templates of corresponding combinations need to be added, and each independent interpretation template is also easier to update and maintain.

Figure 2:
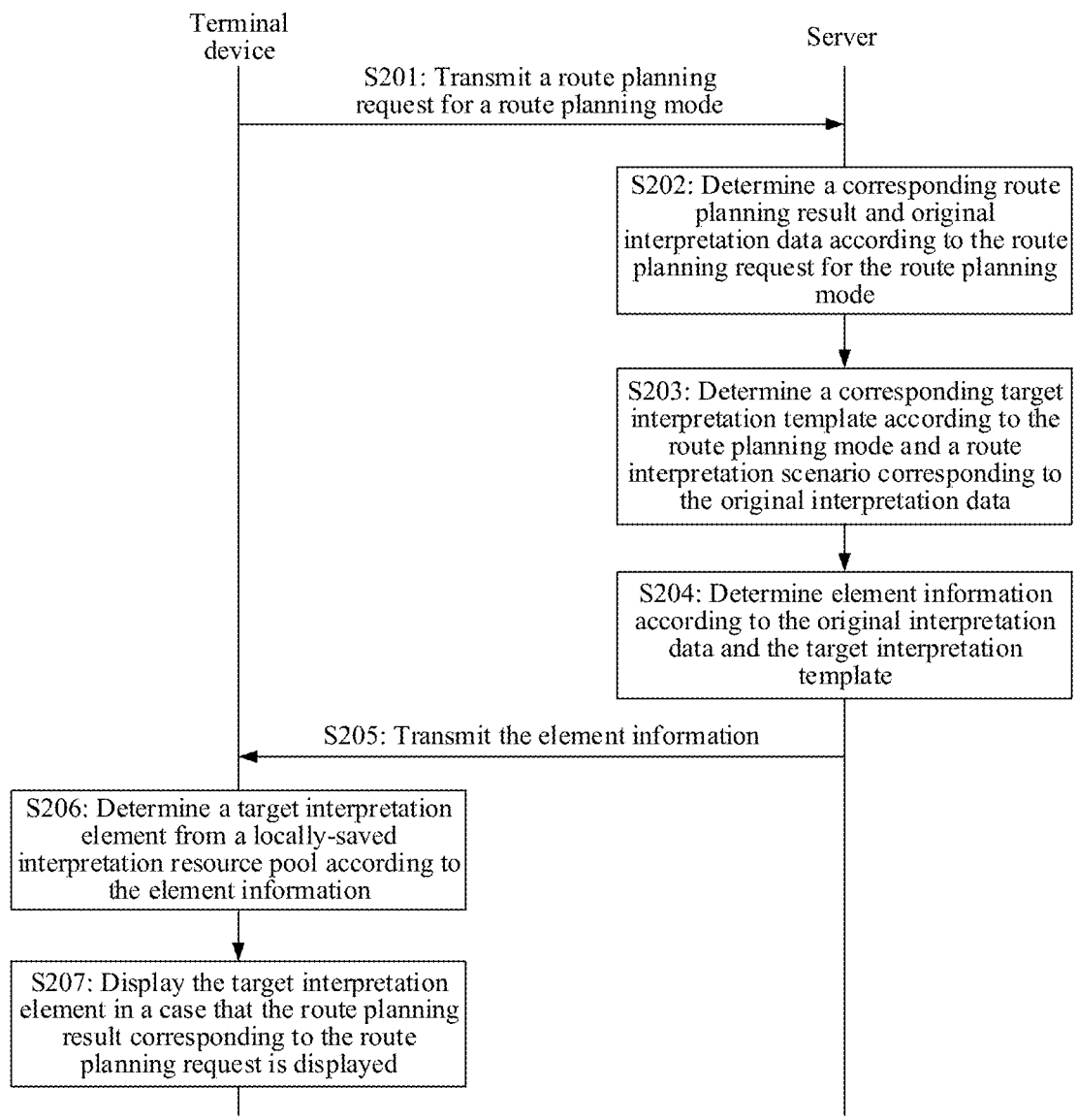
FIG. 2 is a signaling interaction diagram of a route display system according to an embodiment of this application.

Referring to FIG. 2, FIG. 2 is a signaling interaction diagram of a route display system according to an embodiment of this application. As shown in FIG. 2, the route display system includes a terminal device and a server. The terminal device is mainly configured to implement display of a route planning result and a target interpretation element. The server is mainly configured to implement retrieval of a target interpretation template, determination and delivery of element information, and the like.

S201: The terminal device transmits a route planning request for a route planning mode.

The terminal device transmits the route planning request to the server, so that the server calculates a corresponding route planning result according to the route planning request. For example, the terminal device may transmit the route planning request including a starting point, an end point and via points to the server. Correspondingly, the server can calculate one or more routes passing through the starting point, the end point and the via points based on the starting point, the end point and the via points included in the route planning request.

Setting via points is a type of route planning mode. Even if the starting point and the end point are the same, different route planning results may be obtained by setting different via points. Therefore, when the terminal device transmits the route planning request, the route planning request may be transmitted based on the route planning mode in which the route planning request is transmitted.

This application does not limit timing of transmitting the route planning request. The route planning request may be transmitted in response to a user's active triggering, or the route planning request may be transmitted based on changes of a position of the terminal device, changes of road conditions, periodicity, and other reasons.

The route planning mode has many types. There are usually two timings when the terminal device transmits the route planning request to the server, respectively being, initiating route planning to a designated starting point and a designated end point for the first time, and initiating route planning during navigation. Corresponding to transmitting timings for different route planning requests, the route planning modes can be divided into two categories, respectively being a home plan page mode and an in-navigation mode. The home plan page mode is that the terminal device transmits a route planning request to the server before traveling, which is used for identifying a reason for initiating the route planning request before navigation. The in-navigation mode is that the terminal device transmits a route planning request to the server in a progress of navigating, which is used for identifying a reason for initiating the route planning request during the navigation. Various subdivided route planning modes are further included in the two categories, as shown in Table 1. For example, Hint may be a main and side road switching mode in the home plan page mode, or may be a main and side road switching mode in the in-navigation mode. Ph is a yawing mode in navigation, and the like.

TABLE 1

Route Planning Modes and Corresponding Descriptions

| Before Travel/During Travel | Route Planning Mode | Description |
|---|---|---|
| Home plan page mode | Nil | first-time route planning |
| | Hint | main and side road switching |
| | Fr | user active refreshing |
| | Addviapoint | adding via points |
| | Removeviapoint | removing via points |
| | Up | Inaccurate starting point |
| | Prefchange | preference changing restrictions and license plates |
| In-navigation mode | Hint | main and side road switching |
| | Ph | yawing |
| | Fr | user active refreshing |
| | Fork | accompanied by divergence points |
| | Addviapoint | adding via points |
| | Removeviapoint | removing via points |
| | Routerefresh | earthworm refreshing, road condition refreshing, dynamic road changing |
| | Prefchange | preference changing restrictions and license plates |

S202: The server determines a corresponding route planning result and original interpretation data according to the route planning request for the route planning mode.

After the server receives the route planning request for the route planning mode transmitted by the terminal device, the corresponding route planning result can be calculated based on a starting point and an end point included in the route planning request, the route planning mode, and the like. A problem of calculating the route planning result can be transformed into a mathematical problem. By setting some objective functions, for example, one or more objective functions such as the least time spent on the route, the shortest route distance, and the least number of traffic lights passing through, combining user preferences and route features from multiple dimensions, and using deep learning and other algorithms to train a corresponding ranking recommendation model, first K route planning results are calculated, and the first K route planning results are transparently transmitted to the terminal device for displaying to a user. For example, a plurality of routes displayed on the first plan page may be the first K route planning results calculated through the ranking recommendation model.

When the K route planning results are displayed to the user in the form of routes on a map, one of the routes will become a recommended route and be displayed in a highlighted form. The remaining (K−1) routes are generally additional reference routes and are displayed in darker colors, so that the user can perform route switching, improving user experience. As shown in FIG. 1, two route planning results are displayed to the user in the form of routes on the map, respectively being a route A and a route B. The route A is a recommended route, and the route B is an additional reference route.

For recommended routes, the user sometimes may have some questions, for example, "The route recommended this time is a bit detoured.", "Why is a familiar route not recommended this time?" and the like. When the user finds the recommended routes incomprehensible, a certain exclusion psychological may occur, for example, "Obviously, both distance and time are short if taking a high-speed route, so why a high-speed route is not planned? Is there a problem with the navigation? I won't use it next time.", and the like. The server may not only determine a corresponding route planning result, but also determine original interpretation data according to the route planning request for the route planning mode. The original interpretation data is data used for interpreting problems that may be involved in the planned route, for example, "The planned route is a bit detoured because it avoids congestion or hard-to-walk paths.", "A familiar route is not recommended due to construction of a road section", "A high-speed route having a short distance and taking a short time is not recommended due to highway closures", and the like. The user can trust the recommended routes through the original interpretation data, thereby improving the user's navigation participation and completion.

S203: Determine a corresponding target interpretation template according to the route planning mode and a route interpretation scenario corresponding to the original interpretation data.

To make the route planning results combined with the original interpretation data more intuitive and easier for the user to understand, some interpretation elements may be added when the route planning results are displayed, such as icons and copywriting, so that more interpretation information can be displayed in a limited interface display range of the terminal device. The original interpretation data includes a corresponding route interpretation scenario. For example, the route interpretation scenario may be whether the planned route avoids congestion, passes through mountain roads, avoids mountain roads, avoids road closures, avoids hard-to-walk paths, or the like.

Different route interpretation scenarios may require interpretation elements of different types for interpretation, and even for the same starting point and end point, different route planning results may be obtained based on different route planning modes. Correspondingly, different interpretation elements of different types are required for interpretation. Thus, the corresponding target interpretation template may be jointly determined through the route planning mode and the route interpretation scenario, and the required interpretation element is obtained. Content of the interpretation template mainly defines some control items required for the interpretation element. For example, the control items may be information such as whether to present a relevant interpretation element, default copywriting content, a priority and a style value. By modifying control items for changing the interpretation template, the interpretation element required for different combinations can be flexibly configured, and there is no need for both the server and the terminal device to modify or add relevant protocol data. In addition, removing cumbersome coding and debugging, logic iteration and other stages can achieve an effect of rapid iteration. The content of the interpretation template and corresponding description are shown in Table 2.

TABLE 2

Content of the Interpretation Template and Corresponding Description

| Field | Description | Field | Description |
| --- | --- | --- | --- |
| Need_tips | whether tips are presented | Need_marker | whether a marker is presented |
| Tips_icon | a tips icon | Marker_icon | a marker icon |
| Tips_title | prompting a default title | Marker_priority | marking a priority |
| Tips_content | prompting default content | Marker_disappear | marking a disappearance |
| Tips_priority | prompting a priority | Marker_cloud_key | marking a style value |
| Tips_cloud_key | prompting a style value | Marker_clickable | marking whether it is clickable |
| Need_bubble | whether a bubble is presented | Need_line | whether a line is presented |
| Bubble_content | bubble content | Line_cloud_key | a line style value |
| Bubble_icon | a bubble icon | Line_priority | a line priority |
| Bubble_cloud_key | a bubble style value | Need_area | whether an area is present |

TABLE 2-continued

Content of the Interpretation Template and Corresponding Description

| Field | Description | Field | Description |
|---|---|---|---|
| Bubble_priority | a bubble priority | Area_cloud_key | an area style value |
| Bubble_disappear | a bubble disappearance | Area_priority | an area priority |

Templating the interpretation elements and presentation manners thereof makes the server flexibly control the presentation manners of the interpretation elements, and an implementation logic tends to be unified based on the interpretation templates. In addition, a flexible control of the presentation manners of the interpretation elements is realized, and a problem that the presentation manner cannot be modified due to a released version is resolved. In addition, with an increase of the route interpretation scenarios and the route planning modes, only the interpretation templates corresponding to the combinations need to be added, and each independent interpretation template is also easier to update and maintain.

S204: Determine element information according to the original interpretation data and the target interpretation template.

The element information includes an element identifier of the target interpretation element corresponding to the route planning result. The target interpretation element is a display form of the interpretation element required for the route planning result. The element identifier of the target interpretation element is an index of the display form in an interpretation resource pool of the terminal device. For example, if Zhang San wants to go to a supermarket, the target interpretation element may be a prompt indicating whether the supermarket is open or not. The target interpretation element can be obtained in the interpretation resource pool by using the element identifier corresponding to the prompt.

Most content of the element information has already been defined in the target interpretation template. When the required element information is constructed, it is only necessary to calculate whether the element information transmitted to the terminal device is issued, what style, specific copywriting and other information according to the target interpretation template and the original interpretation data, thereby determining a rendering and presentation manner of the element information in the terminal device.

Figure 8:
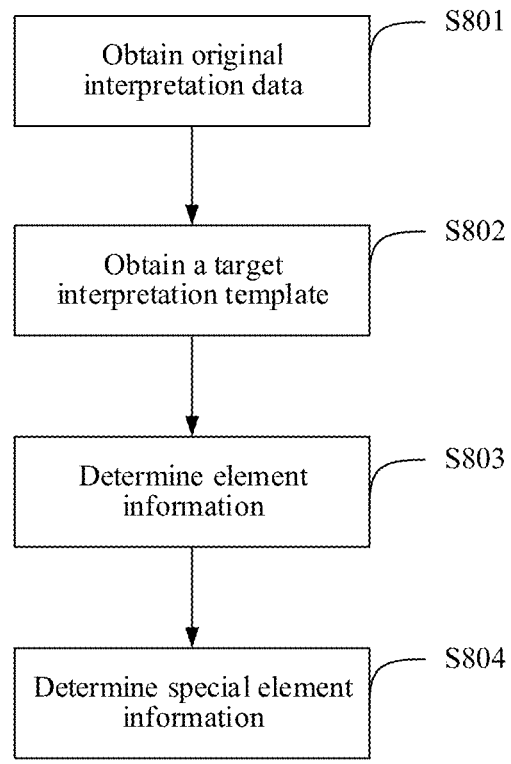
FIG. 8 is a schematic diagram of determining element information according to an embodiment of this application.

In some special route interpretation scenarios, corresponding special element information needs to be obtained from an external service. Referring to FIG. 8, the figure is a schematic diagram of determining element information according to an embodiment of this application.

S801: Obtain original interpretation data.
S802: Obtain a target interpretation template.
S803: Determine element information.
S804: Determine special element information.

In special route interpretation scenarios such as road restrictions and road closures, it is necessary to obtain detailed information of road restrictions and road closures by calling an external service according to road information where the route interpretation scenario is located in the original interpretation data. Then, the corresponding target interpretation template is converted into special element information such as restricted lines, restricted areas or road closure prompts.

S205: The server transmits the element information to the terminal device.

The server transmits the element information to the terminal device, so that the terminal device can obtain a target interpretation element through the element information, and then display the target interpretation element when the route planning result is displayed.

S206: The terminal device determines a target interpretation element from a locally-saved interpretation resource pool according to the element information.

After obtaining the element information transmitted by the server, the terminal device searches for the target interpretation element in the interpretation resource pool according to the element information. The interpretation resource pool is stored locally by the terminal device, and the interpretation resource pool includes various element materials of the elements to be interpreted, and is indexed by the element identifier. For example, the element material may be presentation manners such as background color, font size, spacing of the interpretation element, and data such as background images and icons.

Thus, the terminal device can determine the required target interpretation element through the element information transmitted by the server without a need for the terminal device to implement relevant logics such as whether the interpretation element is to be presented, presented in what style, and a presentation priority. The relevant logics are all implemented in the server. In the terminal device, only how the interpretation element is rendered and presented and overlay logic needs to be focused on, and which services the element information is to be obtained from does not need to be focused on, which makes the terminal device more lightweight, thereby simplifying an internal implementation process of the terminal device and reducing complexity.

S207: The terminal device displays the target interpretation element when a route planning result corresponding to the route planning request is displayed.

Figure 9:
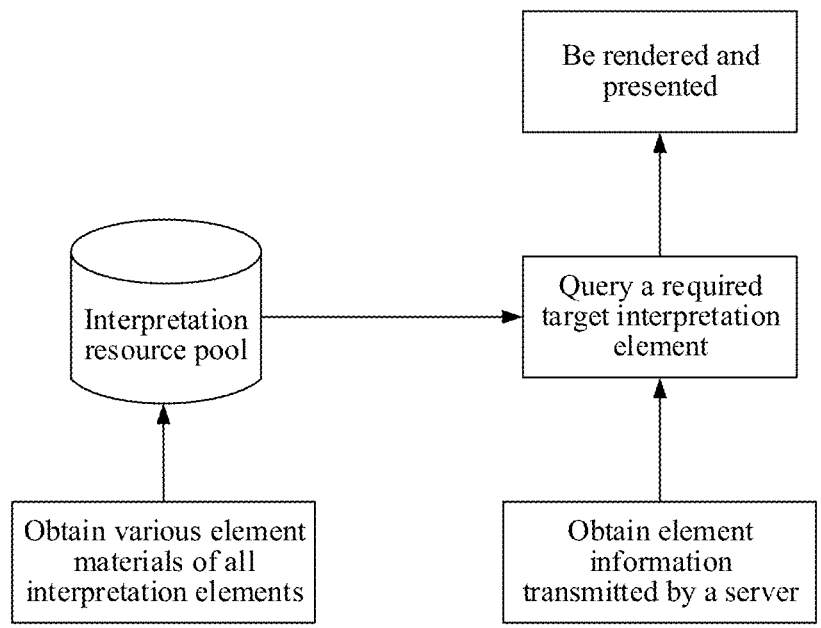
FIG. 9 is a framework diagram of displaying a target interpretation element by a terminal device according to an embodiment of this application.

Referring to FIG. 9, the figure is a framework diagram of displaying a target interpretation element by a terminal device according to an embodiment of this application. The terminal device can obtain various element materials of all interpretation elements in advance. For example, when the terminal device starts, various element materials of all interpretation elements are obtained, and an interpretation resource pool is formed by using all the element materials and stored locally in the terminal device for subsequent use.

After the server transmits the element information to the terminal, the terminal device queries a required target interpretation element from the interpretation resource pool according to the element information. When the route planning request is displayed, the target interpretation element is rendered and presented in the route planning result and presented to a user at the same time.

After the terminal device obtains the target interpretation element, a position corresponding to the target interpretation element can be calculated according to the route planning result, and the target interpretation element is displayed at the corresponding position when a route planning result corresponding to the route planning request is displayed.

It can be seen from the foregoing technical solutions that the terminal device obtains the route planning request for the route planning mode and transmits it to the server, and the server can determine the corresponding route planning result and the original interpretation data that may be involved in the current route planning result according to the route planning request for the route planning mode. The route interpretation scenario corresponding to the original interpretation data and the route planning mode are used as query words to query the corresponding target interpretation template. The target interpretation element that needs to be displayed when the terminal device displays the route planning result can be determined through the target interpretation template, and the target interpretation element is as an explanation of the route planning result. Such a manner of determining the interpretation templates decouples combinations of various route planning modes and route interpretation scenarios from each other, so that maintenance and update may be independently performed, a hard-coding stage in related art is eliminated, only interpretation templates corresponding to the combinations need to be added when route interpretation scenarios are newly added, and each independent interpretation template is also easier to update and maintain. Moreover, even for a new route interpretation scenario, the terminal device can complete display of the interpretation element only based on instruction of the element information, which no longer requires cumbersome coding debugging and logic iteration, freeing up processing resources of the terminal device.

The foregoing technical solutions may be applied to different map products. For example, a map product type may be a mobile phone map, a Pangu map software development kit (SDK), a car-connected map, and the like. The need to interpret route planning results may vary between different map products, and due to differences in display manners and configuration locations, for different map products, even if they are based on the same route planning mode and route interpretation scenario, interpretation elements to be displayed are likely to differ. Therefore, each independent interpretation template needs to be defined separately. To obtain a target interpretation template corresponding to the route planning request transmitted by this map product, relevant information about a map product type may be added when the route planning request is transmitted. Thus, the target interpretation template can be jointly determined based on three attributes of the route planning mode, the route interpretation scenario and the map product type. By adding the map product type to determine the target interpretation template, differentiated requirements between different map products can be completed by modifying or adding interpretation templates, which can not only allow different map products to independently debug their own templates, but also reuse an ability to interpret route planning results between map products.

For example, when the interpretation template is uniquely determined by the three attributes of the route planning mode, the route interpretation scenario and the map product type, the foregoing triplet can be defined as a key value of the interpretation template, which is formally defined as: Key=<map product type, route planning mode, route interpretation scenario>. For example, some map product types are shown in Table 3, some route planning modes are shown in Table 1, and some route interpretation scenarios are shown in Table 4. If key is Mobile_Nil_0, it means that the map product type is a mobile phone map, the route planning mode is first-time route planning, and the route interpretation scenario is avoiding closure.

TABLE 3

Map Product Type and Description

| Map product type | Description |
| --- | --- |
| Mobile | mobile phone map |
| Pangu | Pangu map software development kit |
| Wecar | car-connected map |

TABLE 4

Route Interpretation Scenario and Description

| Route interpretation scenario | Description |
| --- | --- |
| 0 | avoiding closure |
| 1 | passing through closure |
| 2 | avoiding congestion |

When the route planning result is displayed, the most basic service is to display the route planning result, and based on this, an interpretation service for the route planning result is further realized. Based on this, the route planning result and the element information may be transmitted to the terminal device in two successive steps, thereby ensuring that the terminal device can display the route planning result even if there is a problem that the element information cannot be obtained.

After the server determines the route planning result according to the route planning request, the route planning result is first returned to the terminal device, so that the terminal device can display the route planning result. In addition, the server saves a correspondence between a route planning identifier (RPID) of the route planning result and the element information. After the terminal device obtains a route planning result returned by the server, an interpretation service request can be transmitted to the server according to the route planning identifier included in the route planning result. After the server obtains the interpretation service request, element information corresponding to the route planning identifier can be retrieved according to the route planning identifier included in the interpretation service request and the previously saved correspondence, to transmit the element information to the terminal device, so that the terminal device displays the target interpretation element when the route planning result is displayed.

The terminal device transmits the route planning request and the interpretation service request to the server in two steps, so that the server transmits the results obtained by calling for two times, respectively being the route planning result and the element information, to the terminal device in two steps. When the terminal device cannot obtain the element information, the terminal device can still normally display the route planning result, and the terminal device will not be unable to obtain any returned result due to the inability to obtain the element information, ensuring the stability of the system and improving a success rate of terminal device display.

Figure 3:
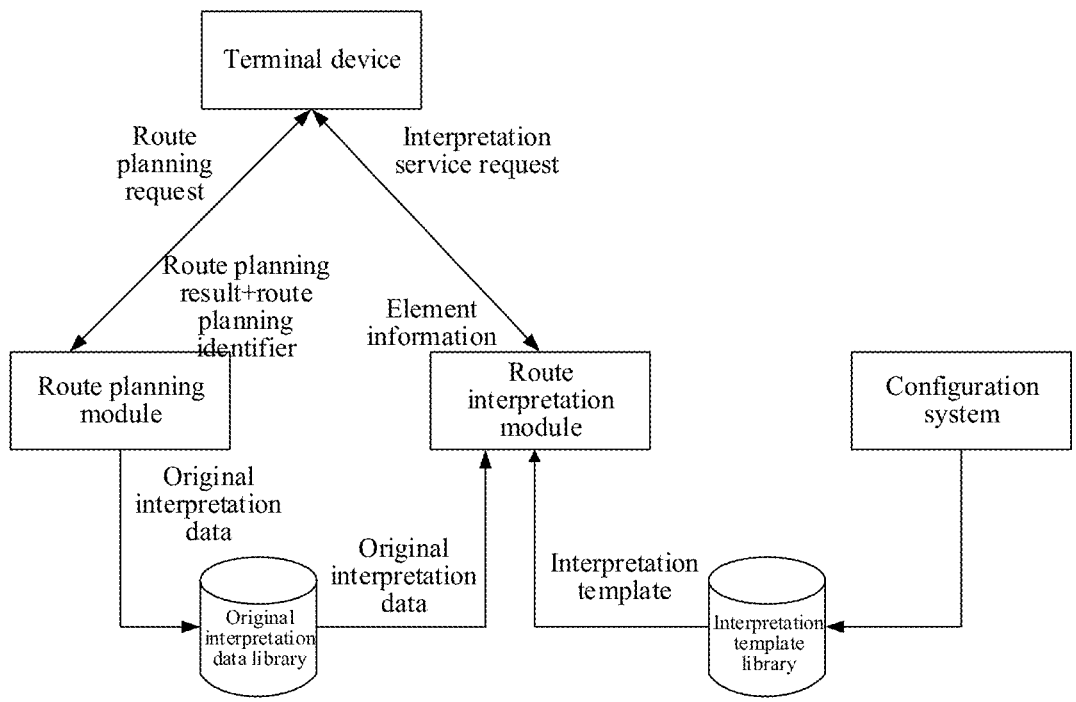
FIG. 3 is a framework diagram of a route display system according to an embodiment of this application.

To make the technical solutions provided in this application clearer to a person skilled in the art, an embodiment is described below. Referring to FIG. 3, the figure is a framework diagram of a route display system according to an embodiment of this application.

To separate a route planning service and a route interpretation service, a route planning module and a route interpretation module may be configured in the server. The route planning result is returned through the route planning module, and the element information is returned through the route interpretation module. Specifically, every time the terminal device transmits a route planning request, the route planning module may determine a corresponding route planning result according to the route planning request. If the route planning result this time involves the original interpretation data, the route planning module will generate a route planning identifier corresponding to the route planning result, and return the route planning result and its corresponding route planning identifier to the terminal device.

The route planning module writes the original interpretation data corresponding to the route planning identifier into an original interpretation database. The original interpretation database may be a remote dictionary server (Redis) database. This is not specifically limited in this application.

After the route interpretation module obtains an interpretation service request transmitted by the terminal device, corresponding original interpretation data will be retrieved from the original interpretation database according to the route planning identifier included in the interpretation service request, and a route planning mode and a route interpretation scenario are obtained according to the retrieved original interpretation data. The route interpretation module usually obtains all interpretation templates from the interpretation template library in advance, and determines a corresponding target interpretation template from all the templates according to the route planning mode and the route interpretation scenario. The interpretation template library may be generated and maintained through an external configuration system.

The route interpretation module determines element information according to the original interpretation data and the target interpretation template, and transmits the element information to the terminal device.

The interpretation template library is separately split to the external configuration system and is maintained and operated, so that developers can only focus on how to use the interpretation template to implement an interpretive internal logic without maintaining specific template content. On the other hand, product and operation personnel can flexibly modify and change the template content through the external configuration system, and do not have to care about how the template content is used. The system is properly divided by focusing on difference of the content to achieve an effect of efficient coordination.

With continual increase of the route planning modes and the route interpretation scenarios, the interpretation templates corresponding to the combinations are also increasing. After the interpretation template is added or changed with the help of the external configuration system, the updated template data needs to be synchronized to the server, thereby ensuring data consistency. To ensure that the service will not be interrupted during synchronization, the embodiment of this application may implement the data consistency by using a full double-buffering hot loading manner. The first interpretation template library and the second interpretation template library are constructed in a server cache. The target interpretation template may be determined according to the interpretation template in the first interpretation template library.

Figure 4:
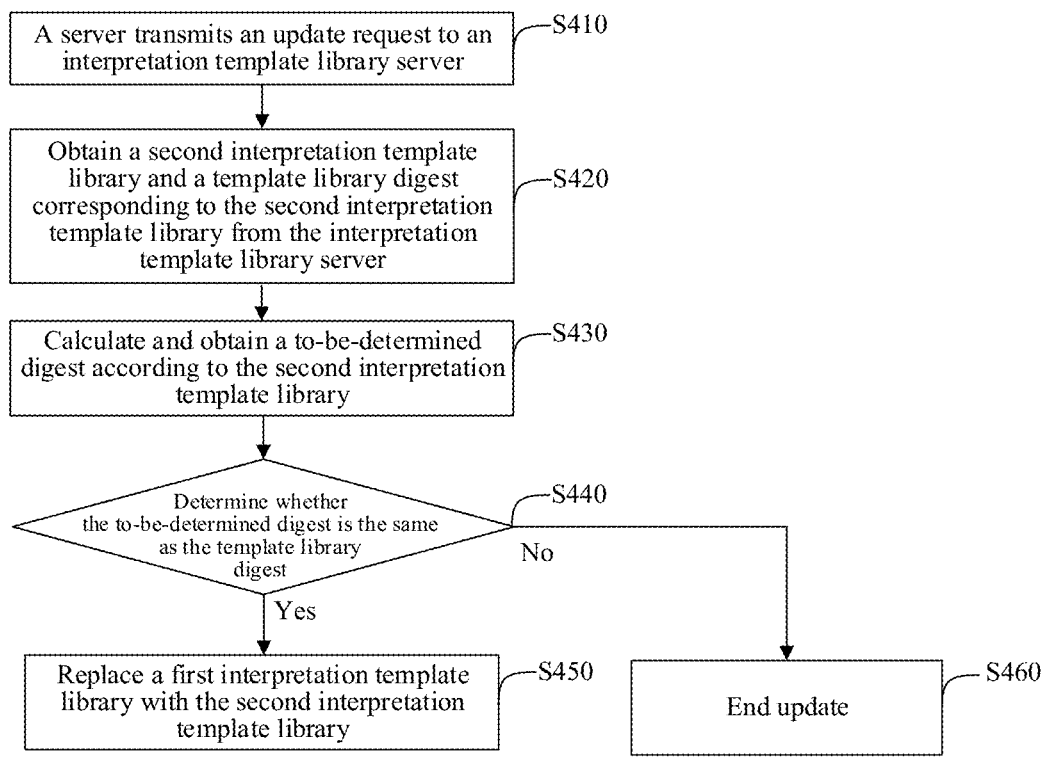
FIG. 4 is a flowchart of updating an interpretation template according to an embodiment of this application.

Referring to FIG. 4, the figure is a flowchart of updating an interpretation template according to an embodiment of this application.

S410: The server transmits an update request to an interpretation template library server.

For a route planning problem, data consistency may be achieved within a period of time. Transmitting the update request to the interpretation template library server at regular intervals may be set in the server, so that data in the interpretation template library can be consistent with data in the server. Certainly, in practical application, the interpretation template library can also actively deliver updated interpretation templates to the server periodically.

S420: Obtain a second interpretation template library and a template library digest corresponding to the second interpretation template library from the interpretation template library server.

The server obtains the second interpretation template library and the template library digest corresponding to the second interpretation template library from the interpretation template library of the interpretation template library server.

S430: Calculate and obtain a digest according to the second interpretation template library.

When the server obtains the second interpretation template library, the obtainment is likely to fail or be incomplete, so that an obtained second interpretation template library is different from the interpretation template in the interpretation template library. Based on this, the server may calculate the digest according to the obtained second interpretation template library, and then compare the digest with the template library digest corresponding to the obtained second interpretation template library.

S440: Determine whether the digest is the same as the template library digest. If so, perform S450; or if not, perform S460.

S450: If the digest is the same as the template library digest, replace the first interpretation template library with the second interpretation template library.

If the digest is the same as the template library digest, it means that content of the second interpretation template library is the same as content in the interpretation template library, and the first interpretation template library can be replaced with the second interpretation template library to complete the update.

S460: If the digest is different from the template library digest, end the updating.

If the digest is different from the template library digest, it means that the obtained second interpretation template library may be damaged, and the updating needs to be ended.

Thus, by caching the first interpretation template library and the second interpretation template library in a server cache, after determining that the second interpretation template library is the same as the interpretation template in the interpretation template library, the first interpretation template library will be replaced with the second interpretation template library. In the foregoing replacement process, the first interpretation template library may continue to provide the server with an interpretation service for the route planning result. Therefore, not only data consistency is realized, but also the interpretation service for the route planning result will not be interrupted during the realization process.

Since the server does not know whether the interpretation templates in the interpretation template library are modified or added, to save computing resources, whether the second interpretation template library is changed can be determined before the second interpretation template library is obtained.

Figure 5:
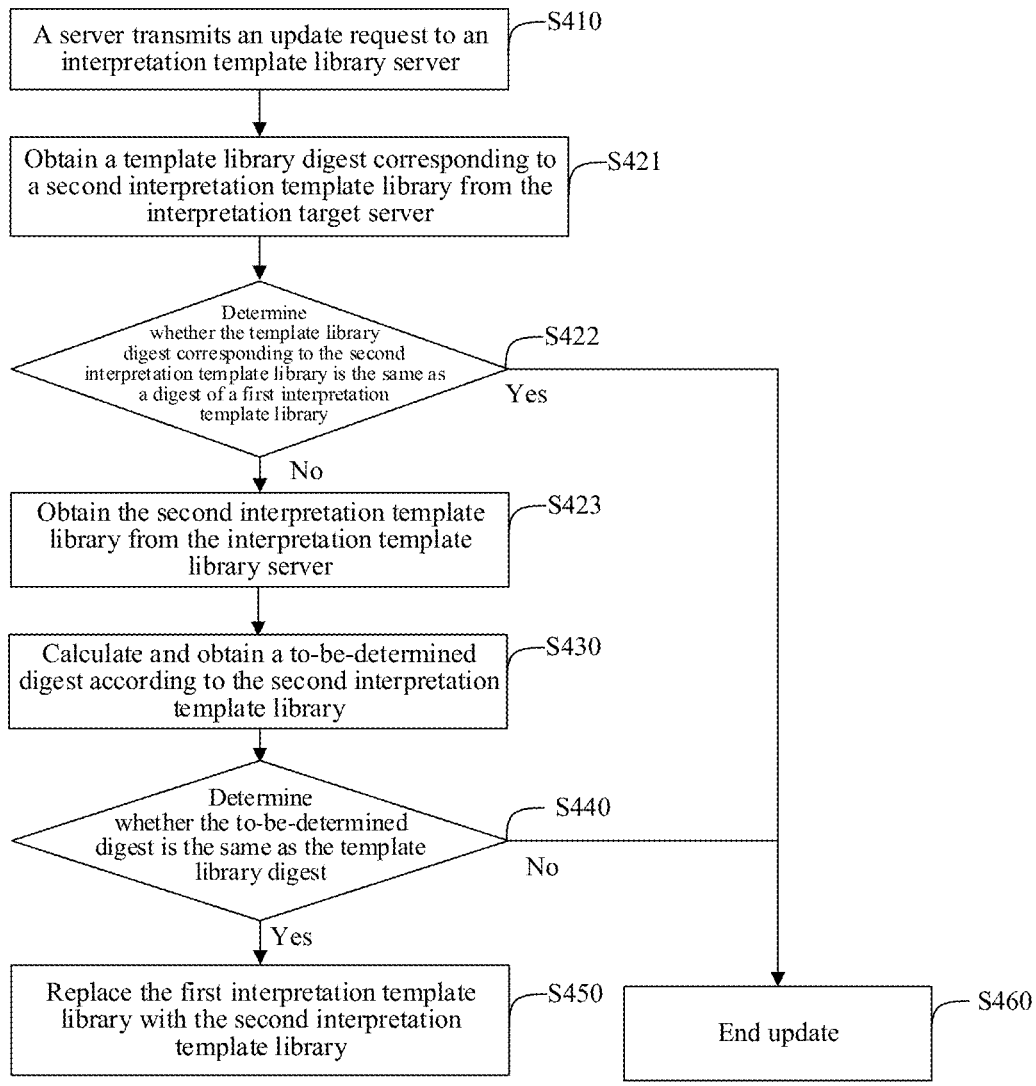
FIG. 5 is a flowchart of updating an interpretation template according to an embodiment of this application.

If the second interpretation template library is different from the first interpretation template library, using the second interpretation template library to update the first interpretation template library. Referring to FIG. 5, the figure is a flowchart of updating an interpretation template according to an embodiment of this application. S420 can be implemented through S421 to S424, and only S421 to S424 are described below.

S421: Obtain a template library digest corresponding to the second interpretation template library from the interpretation target server.

S422: Determine whether the template library digest corresponding to the second interpretation template library is the same as a digest of the first interpretation template library. If so, perform S460; or if not, perform S423.

S460: If the template library digest corresponding to the second interpretation template library is the same as the digest of the first interpretation template library, end the updating.

S423: If the template library digest corresponding to the second interpretation template library is different from the digest of the first interpretation template library, obtain the second interpretation template library from the interpretation template library server.

To better maintain and update the interpretation template and the original interpretation data, interpretation elements in the interpretation template and the original interpretation data can be protocolized. For example, a constituent unit of the interpretation elements may be determined based on the type of the interpretation elements, such as point, line and area. Specifically, the constituent unit may be a field such as a line string, a point string, copywriting, and a possible ID list extracted from a combination of the route planning mode and the route interpretation scenario. The point string may be all possible situations that are involved in point type interpretation elements, such as a circle point and a square point. The server constructs a route interpretation protocol according to the constituent unit; and determines the original interpretation database and a first interpretation template library including the target interpretation template according to the route interpretation protocol. The interpretation elements required for the interpretation template and the original interpretation data are protocolized through the constituent unit, and such interpretation elements can be provided in a form of an interface to realize a mutual decoupling between the route planning module and the route interpretation module in the server, thereby independently maintaining and updating.

The target interpretation template includes a constituent unit of a interpretation element, content of the interpretation element, a style value of the interpretation element and a priority of the interpretation element.

To better understand the route display method provided in the foregoing embodiments, the following describes application scenarios of the route display method provided in the embodiments of this application with reference to FIGS. 6A to 6C and FIG. 7.

Figure 6A:
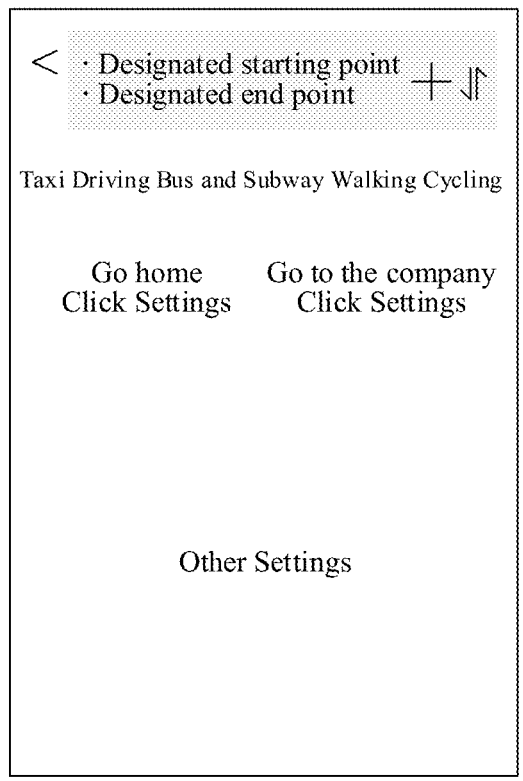
FIG. 6A is a schematic diagram of an application scenario of a route display method according to an embodiment of this application.
Figure 6B:
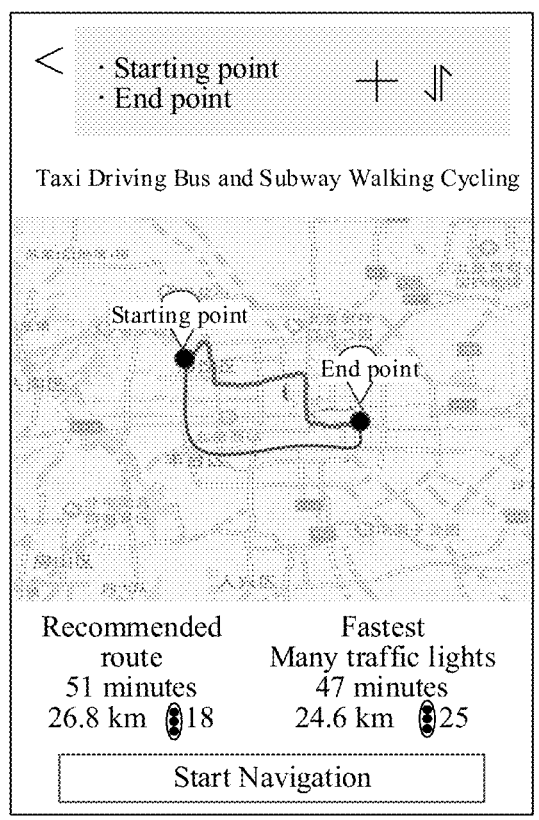
FIG. 6B is a schematic diagram of an application scenario of a route display method according to an embodiment of this application.
Figure 6C:
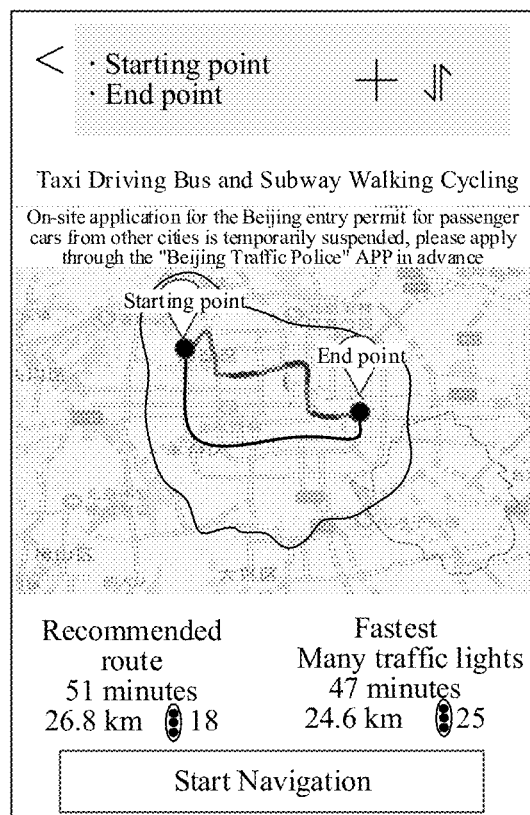
FIG. 6C is a schematic diagram of an application scenario of a route display method according to an embodiment of this application.
Figure 7:
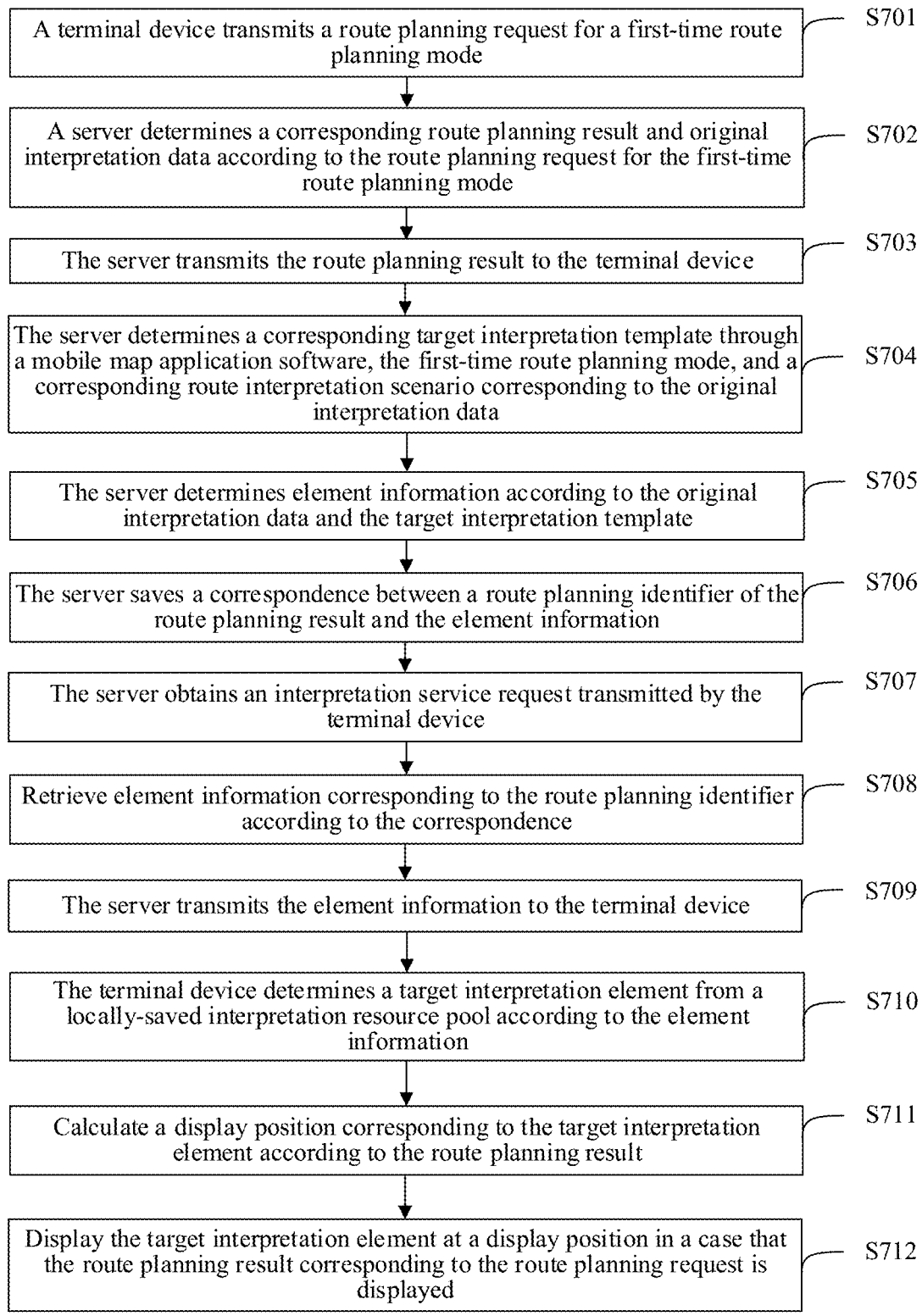
FIG. 7 is a flowchart of an application scenario of a route display method according to an embodiment of this application.

Referring to FIGS. 6A to 6C, FIGS. 6A to 6C are schematic diagrams of an application scenario of a route display method according to an embodiment of this application. With reference to the method shown in FIG. 7, the route display method includes the following steps:

S701: A terminal device transmits a route planning request for a first-time route planning mode.

As shown in FIG. 6A, after using the terminal device to open a mobile map application software, a user can enter a designated starting point and a designated end point in a search box, and choose one of appearance manners such as taxi, driving, bus and subway, walking and cycling. The terminal device generates and transmits this route planning request to the server according to the operation triggered by the user. As shown in FIG. 6A, settings for common travel locations such as home and company and other settings are further provided on the page, which is convenient for adding or modifying the route planning modes.

S702: A server determines a corresponding route planning result and original interpretation data according to the route planning request for first-time route planning mode.

According to a designated starting point and a designated end point, the server determines two routes from a starting point to an end point, respectively being a route A: taking 51 minutes to drive, a whole journey being 26.8 kilometers, and passing through 18 traffic lights, and a route B: taking 47 minutes to drive, a whole journey being 24.6 kilometers, and passing through 25 traffic lights. The route planning result may further involve original interpretation data such as vehicle restrictions and passenger cars from other cities entering Beijing.

S703: The server transmits the route planning result to the terminal device.

The route planning result is first returned to the terminal device to preliminarily ensure that the terminal device can normally display the route planning result. That is, even if a problem occurs in any of the steps in S704 to S712, a normal display of the route planning result can still be guaranteed. As shown in FIG. 6B, it is a schematic diagram of an interface that only displays the route planning result.

S704: The server determines a corresponding target interpretation template through a mobile map application software, the first-time route planning mode, and a corresponding route interpretation scenario corresponding to the original interpretation data.

A triplet composed of the map product type, the route planning mode and the route interpretation scenario corresponding to the original interpretation data is used as a basis for finding a required target interpretation template.

S705: The server determines element information according to the original interpretation data and the target interpretation template.

Information such as whether a target interpretation element is presented, default copywriting, a priority, a style value is calculated according to the original interpretation data and target template interpretation data.

S706: The server saves a correspondence between a route planning identifier of the route planning result and the element information.

S707: The server obtains an interpretation service request transmitted by the terminal device, and the interpretation service request includes the route planning identifier of the route planning result.

S708: Retrieve element information corresponding to the route planning identifier according to the correspondence.

S709: The server transmits the element information to the terminal device.

S710: The terminal device determines a target interpretation element from a locally-saved interpretation resource pool according to the element information.

S711: Calculate a display position corresponding to the target interpretation element according to the route planning result.

S712: Display the target interpretation element at the corresponding display position when a route planning result corresponding to the route planning request is displayed.

If the system is stable, the target interpretation element may be displayed at the corresponding display position. For example, relevant prompts about vehicle restrictions or passenger cars from other cities entering Beijing are represented through an area type; As shown in FIG. 6C, an area covered by a larger surface indicates a vehicle restricted area, prompting the vehicle to choose to take a detour or drive straight according to a restriction indication. An area covered by a smaller surface indicates that beyond this area is the Beijing area. If the passenger car from other cities drives out of this area, a Beijing entry permit for passenger cars from other cities needs to be applied for. It can not only be interpreted through the area type interpretation element, but also can be prompted through copywriting. For example, "On-site application for the Beijing entry permit for passenger cars from other cities is temporarily suspended, please apply through the "Beijing Traffic Police" APP in advance" to help the user to make a travel plan. Further, congestion existing in the route can also be represented through a line type, and the degree of congestion can also be shown through different colors.

For the route display method provided in the foregoing embodiment, an embodiment of this application further provides a route display apparatus.

Figure 10:
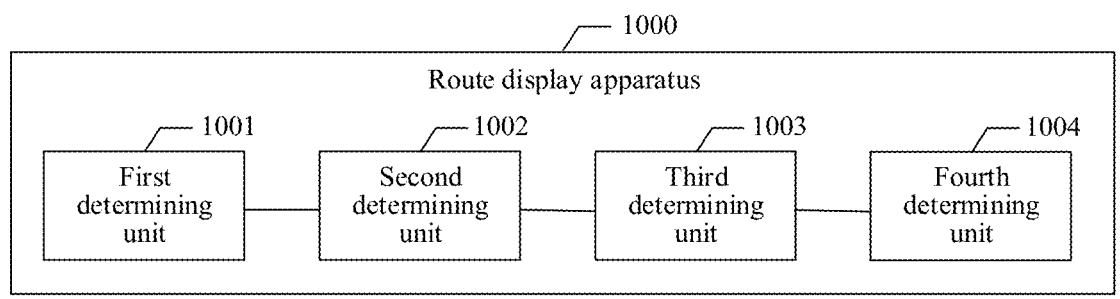
FIG. 10 is a schematic diagram of a route display apparatus according to an embodiment of this application.

Referring to FIG. 10, the figure is a schematic diagram of a route display apparatus according to an embodiment of this application. The apparatus 1000 includes: a first determining unit 1001, a second determining unit 1002, a third determining unit 1003 and a fourth determining unit 1004;

the first determining unit 1001 being configured to determine a corresponding route planning result and original interpretation data according to a route planning request for a route planning mode, the route planning mode being used for identifying a reason for initiating the route planning request;

the second determining unit 1002 being configured to determine a corresponding target interpretation template according to the route planning mode and a route interpretation scenario corresponding to the original interpretation data;

the third determining unit 1003 being configured to determine element information according to the original interpretation data and the target interpretation template, the element information including an element identifier of a target interpretation element corresponding to the route planning result; and the fourth determining unit 1004 being configured to transmit the element information to a terminal device, the element identifier in the element information being used for instructing to display the target interpretation element when the terminal device displays the route planning result.

As a possible implementation, the route planning request further includes a map product type associated with the route planning request. The second determining unit 1002 is configured to:

determine the corresponding target interpretation template according to the map product type, the route planning mode and the route interpretation scenario corresponding to the original interpretation data.

As a possible implementation, the target interpretation template is determined from an interpretation template included in a first interpretation template library. The apparatus 1000 is further configured to:

obtain a second interpretation template library and a template library digest corresponding to the second interpretation template library from an interpretation template library server;

calculate and obtain a digest according to the second interpretation template library; and replace the first interpretation template library with the second interpretation template library when verification succeeds based on the digest and the template library digest corresponding to the second interpretation template library.

As a possible implementation, the apparatus 1000 is further configured to:

determine a constituent unit of an interpretation element based on a type of the interpretation element;

construct a route interpretation protocol according to the constituent unit; and determine the original interpretation data and a first interpretation template library including the target interpretation template according to the route interpretation protocol.

As a possible implementation, the target interpretation template includes a constituent unit of a interpretation element, content of the interpretation element, a style value of the interpretation element and a priority of the interpretation element.

As a possible implementation, the apparatus 1000 is further configured to:

return the route planning result to the terminal device, and save a correspondence between a route planning identifier of the route planning result and the element information;

obtain an interpretation service request transmitted by the terminal device, the interpretation service request including the route planning identifier; and retrieve the element information corresponding to the route planning identifier according to the correspondence and perform steps of transmitting the element information to the terminal device.

Figure 11:
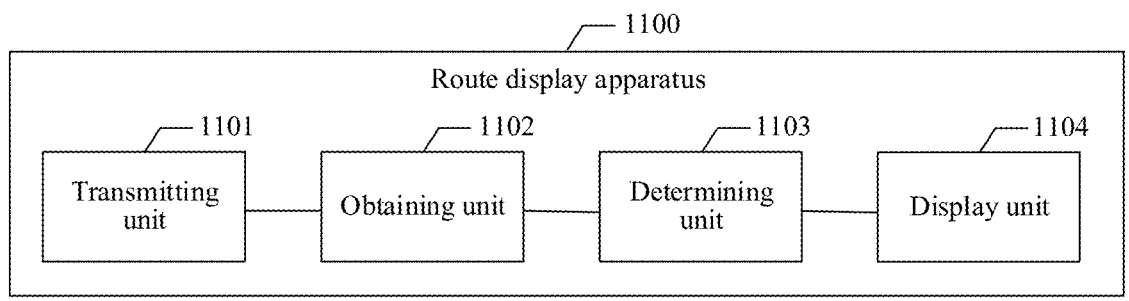
FIG. 11 is a schematic diagram of a route display apparatus according to an embodiment of this application.

An embodiment of this application further provides a route display apparatus. Referring to FIG. 11, the figure is a schematic diagram of a route display apparatus according to an embodiment of this application. The apparatus 1100 includes: a transmitting unit 1101, an obtaining unit 1102, a determining unit 1103 and a display unit 1104;

the transmitting unit 1101 being configured to transmit a route planning request for a route planning mode to a server, the route planning mode being used for identifying a reason for initiating the route planning request;

the obtaining unit 1102 being configured to obtain element information returned by the server, the element information including an element identifier, the element identifier being used for instructing to display a target interpretation element when the terminal device displays a route planning result;

the determining unit 1103 being configured to determine the target interpretation element from a locally-saved interpretation resource pool according to the element identifier included in the element information; and the display unit 1104 being configured to display the target interpretation element when a route planning result corresponding to the route planning request is displayed.

As a possible implementation, before the obtaining element information returned by the server, the apparatus 1100 is further configured to:

obtain a route planning result returned by the server, the route planning result including a corresponding route planning identifier; and transmit an interpretation service request to the server according to the route planning identifier to request to obtain the element information from the server.

As a possible implementation, the route planning mode is used for identifying a reason for initiating route planning before navigation, or a reason for initiating route planning during navigation. The transmitting unit 1101 is configured to:

transmit the route planning request to the server when route planning is initiated for a designated starting point and a designated end point for the first time, or when the route planning is initiated during the navigation.

As a possible implementation, the apparatus 1100 is further configured to:

calculate a display position corresponding to the target interpretation element according to the route planning result.

The display unit 1104 is configured to:

display the target interpretation element at the display position when a route planning result corresponding to the route planning request is displayed.

Figure 12:
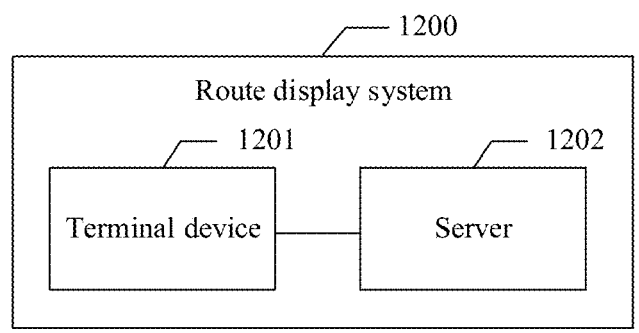
FIG. 12 is a schematic diagram of a route display system according to an embodiment of this application.

An embodiment of this application further provides a route display system. As shown in FIG. 12, the system 1200 includes a terminal device 1201 and a server 1202. The terminal device 1201 is configured to perform the route display method performed by a terminal device side in the foregoing various embodiments; and the server 1202 is configured to perform the route display method performed by a server side in the foregoing various embodiments.

An embodiment of this application further provides a computer device. The following describes the computer device provided in the embodiment of this application from a perspective of hardware materialization.

Figure 13:
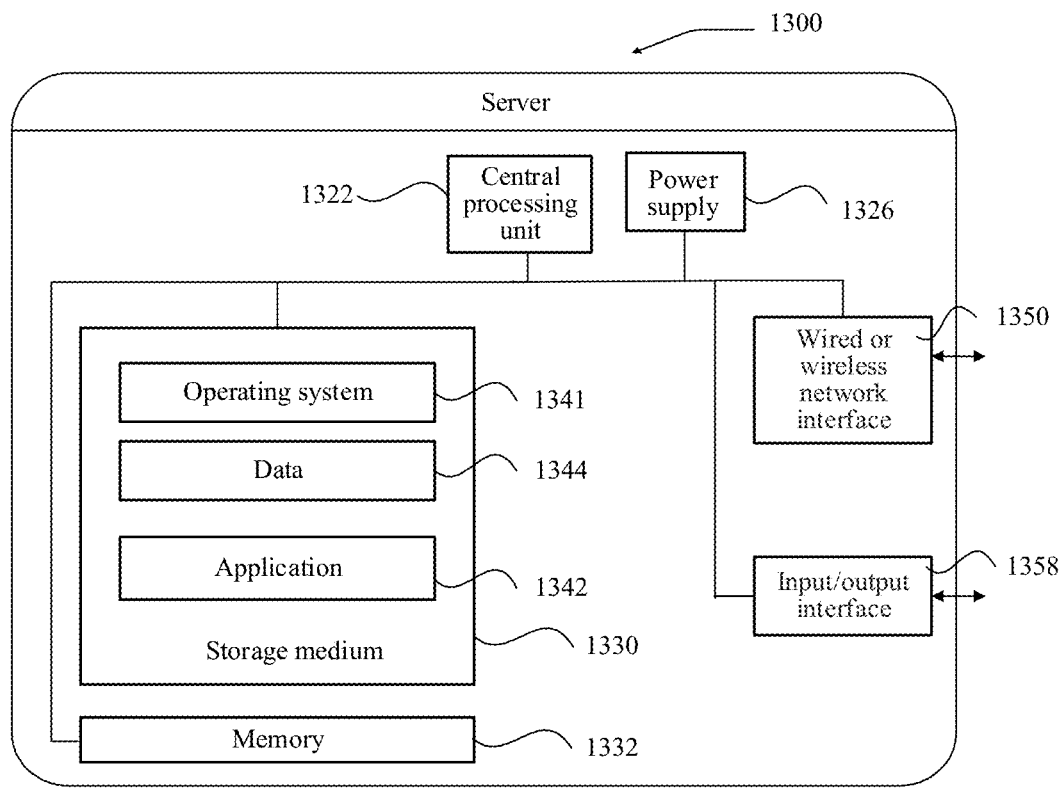
FIG. 13 is a schematic structural diagram of a server according to an embodiment of this application.

Referring to FIG. 13, FIG. 13 is a schematic structural diagram of a server according to an embodiment of this application. The server 1300 may vary greatly due to different configurations or performance, and may include one or more central processing units (CPUs) 1322 (for example, one or more processors) and a memory 1332, and one or more storage media 1330 (for example, one or more mass storage devices) that store an application program 1342 or data 1344. The memory 1332 and the storage medium 1330 may be a transient memory or a persistent memory. A program stored in the storage medium 1330 may include one or more modules (not shown), and each module may include a series of instruction operations for the server. Further, the CPU 1322 may be configured to communicate with the storage medium 1330 to execute a series of instruction operations in the storage medium 1330 on the server 1300.

The server 1300 may also include one or more power supplies 1326, one or more wired or wireless network interfaces 1350, one or more input/output interfaces 1358, and/or, one or more operating systems 1341 such as Windows Server™, Mac OS X™, Unix™, Linux™, and FreeBSD™.

The steps performed by the server in the foregoing embodiments may be based on the server structure shown in FIG. 13.

The CPU 1322 is configured to perform the following operations:

determining a corresponding route planning result and original interpretation data according to a route planning request for a route planning mode, the route planning mode being used for identifying a reason for initiating the route planning request;

determining a corresponding target interpretation template according to the route planning mode and a route interpretation scenario corresponding to the original interpretation data;

determining element information according to the original interpretation data and the target interpretation template, the element information including an element identifier of a target interpretation element corresponding to the route planning result; and transmitting the element information to a terminal device, the element identifier in the element information being used for instructing to display the target interpretation element when the terminal device displays the route planning result.

In some embodiments, the CPU 1322 may further execute method steps of any specific implementation manner of the route display method in the embodiment of this application.

For the route display method described above, an embodiment of this application further provides a terminal device used for route display, so that the foregoing route display method can be implemented and applied in practice.

Figure 14:
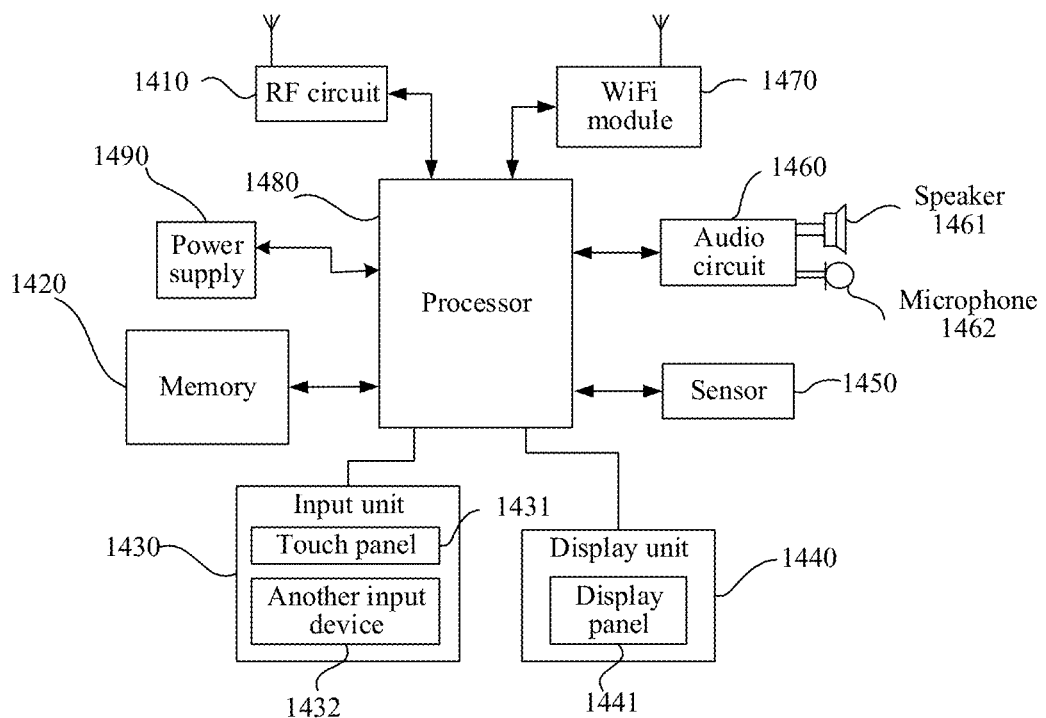
FIG. 14 is a schematic structural diagram of a terminal device according to an embodiment of this application.

Referring to FIG. 14, FIG. 14 is a schematic structural diagram of a terminal device according to an embodiment of this application. For ease of description, only a part related to this embodiment of this application is shown. For a specific technical detail not disclosed, refer to the method part in the embodiments of this application. The terminal device may be any terminal device including a mobile phone, a tablet computer, a personal digital assistant, an in-vehicle terminal, or the like, taking the terminal device being a mobile phone as an example.

FIG. 14 shows a block diagram of a partial structure of a mobile phone related to a terminal device provided in an embodiment of this application. Referring to FIG. 14, the mobile phone includes: a radio frequency (RF for short) circuit 1410, a memory 1420, an input unit 1430 (including a touch panel 1431 and another input device 1432), a display unit 1440 (including a display panel 1441), a sensor 1450, an audio circuit 1460 (may connect a speaker 1461 and a microphone 1462), a wireless fidelity (WiFi for short) module 1470, a processor 1480, a power supply 1490, and other components. A person skilled in the art may understand that the mobile phone structure shown in FIG. 14 does not constitute a limitation to the mobile phone. The mobile phone may include more or fewer components than those shown in the figure, or may combine some components, or may have different component arrangements.

In an embodiment of this application, the memory 1420 included in the mobile phone may store program codes, and transmit the program codes to the processor.

the processor 1480 included in the terminal device also has the following functions:

transmitting a route planning request for a route planning mode to a server, the route planning mode being used for identifying a reason for initiating the route planning request;

obtaining element information returned by the server, the element information including an element identifier, the element identifier being used for instructing to display a target interpretation element when the terminal device displays a route planning result;

determining the target interpretation element from a locally-saved interpretation resource pool according to the element identifier included in the element information; and displaying the target interpretation element when a route planning result corresponding to the route planning request is displayed.

An embodiment of this application further provides a computer-readable storage medium, configured to store a computer program, the computer program being configured to perform the route display method provided in the foregoing embodiment.

An embodiment of this application further provides a computer program product or a computer program, the computer program product or the computer program including computer instructions, the computer instructions being stored in a computer-readable storage medium. A processor of a computer device reads the computer instructions from the computer-readable storage medium, and the processor executes the computer instructions, to cause the computer device to perform the route display method provided in the various implementation manners described above.

The foregoing descriptions are merely a specific implementation of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A route display method performed by a computer device, the method comprising:

receiving a route planning request from a terminal device, the route planning request including a route planning mode used for identifying a reason for initiating a route from a starting point to an end point and a map product type associated with the route planning request;

determining a corresponding route planning result and original interpretation data associated with the route planning request, wherein the corresponding route planning result includes multiple routes and the original interpretation data includes a reason for recommending one of the multiple routes over the other routes;

determining a corresponding target interpretation template according to the map product type, the route planning mode and a route interpretation scenario corresponding to the original interpretation data;

determining element information according to the original interpretation data and the target interpretation template, the element information comprising an element identifier of a first target interpretation element corresponding to the route planning result and an element identifier of a second target interpretation element corresponding to the reason for recommending one of the multiple routes over the other routes; and transmitting the element information to the terminal device, the element identifiers in the element information being used for instructing the terminal device to (i) retrieve the first target interpretation element and the second target interpretation element from a locally-saved interpretation resource pool at the terminal device according to the element identifiers in the element information and (ii) display the first target interpretation element when the terminal device displays the route planning result including at least two of the multiple routes and the second target interpretation element corresponding to the reason for recommending one of the at least two routes over the other route.

2. The method according to claim 1, wherein the target interpretation template is determined from an interpretation template comprised in a first interpretation template library, and the method further comprises:

obtaining a second interpretation template library and a template library digest corresponding to the second interpretation template library from an interpretation template library server;

calculating and obtaining a digest according to the second interpretation template library; and replacing the first interpretation template library with the second interpretation template library when verification succeeds based on the digest and the template library digest corresponding to the second interpretation template library.

3. The method according to claim 2, wherein the method further comprises:

determining a constituent unit of an interpretation element based on a type of the interpretation element;

constructing a route interpretation protocol according to the constituent unit; and determining the original interpretation data and a first interpretation template library comprising the target interpretation template according to the route interpretation protocol.

4. The method according to claim 3, wherein the target interpretation template comprises a constituent unit of an interpretation element, content of the interpretation element, a style value of the interpretation element and a priority of the interpretation element.

5. The method according to claim 4, wherein the method further comprises:

returning the route planning result to the terminal device, and saving a correspondence between a route planning identifier of the route planning result and the element information;

obtaining an interpretation service request transmitted by the terminal device, the interpretation service request comprising the route planning identifier; and retrieving the element information corresponding to the route planning identifier according to the correspondence and performing operations of transmitting the element information to the terminal device.

6. A computer device comprising a processor and a memory:

the memory being configured to store program code; and the processor being configured to execute the program code to perform a route display method including:

receiving a route planning request from a terminal device, the route planning request including a route planning mode used for identifying a reason for initiating a route from a starting point to an end point and a map product type associated with the route planning request;

determining a corresponding route planning result and original interpretation data associated with the route planning request, wherein the corresponding route planning result includes multiple routes and the original interpretation data includes a reason for recommending one of the multiple routes over the other routes;

determining a corresponding target interpretation template according to the map product type, the route planning mode and a route interpretation scenario corresponding to the original interpretation data;

determining element information according to the original interpretation data and the target interpretation template, the element information comprising an element identifier of a first target interpretation element corresponding to the route planning result and an element identifier of a second target interpretation element corresponding to the reason for recommending one of the multiple routes over the other routes; and transmitting the element information to the terminal device, the element identifiers in the element information being used for instructing the terminal device to (i) retrieve the first target interpretation element and the second target interpretation element from a locally-saved interpretation resource pool at the terminal device according to the element identifiers in the element information and (ii) display the first target interpretation element when the terminal device displays the route planning result including at least two of the multiple routes and the second target interpretation element corresponding to the reason for recommending one of the at least two routes over the other route.

7. The computer device according to claim 6, wherein the target interpretation template is determined from an interpretation template comprised in a first interpretation template library, and the method further comprises:

obtaining a second interpretation template library and a template library digest corresponding to the second interpretation template library from an interpretation template library server;

calculating and obtaining a digest according to the second interpretation template library; and replacing the first interpretation template library with the second interpretation template library when verification succeeds based on the digest and the template library digest corresponding to the second interpretation template library.

8. The computer device according to claim 7, wherein the method further comprises:

determining a constituent unit of an interpretation element based on a type of the interpretation element;

constructing a route interpretation protocol according to the constituent unit; and determining the original interpretation data and a first interpretation template library comprising the target interpretation template according to the route interpretation protocol.

9. The computer device according to claim 8, wherein the target interpretation template comprises a constituent unit of an interpretation element, content of the interpretation element, a style value of the interpretation element and a priority of the interpretation element.

10. The computer device according to claim 9, wherein the method further comprises:

returning the route planning result to the terminal device, and saving a correspondence between a route planning identifier of the route planning result and the element information;

obtaining an interpretation service request transmitted by the terminal device, the interpretation service request comprising the route planning identifier; and retrieving the element information corresponding to the route planning identifier according to the correspondence and performing operations of transmitting the element information to the terminal device.

11. A non-transitory computer-readable storage medium storing a computer program that, when executed by a processor of a computer device, causes the computer device to perform a route display method including:

receiving a route planning request from a terminal device, the route planning request including a route planning mode used for identifying a reason for initiating a route from a starting point to an end point and a map product type associated with the route planning request;

determining a corresponding route planning result and original interpretation data associated with the route planning request, wherein the corresponding route planning result includes multiple routes and the original interpretation data includes a reason for recommending one of the multiple routes over the other routes;

determining a corresponding target interpretation template according to the map product type, the route planning mode and a route interpretation scenario corresponding to the original interpretation data;

determining element information according to the original interpretation data and the target interpretation template, the element information comprising an element identifier of a first target interpretation element corresponding to the route planning result and an element identifier of a second target interpretation element corresponding to the reason for recommending one of the multiple routes over the other routes; and transmitting the element information to the terminal device, the element identifiers in the element information being used for instructing the terminal device to (i) retrieve the first target interpretation element and the second target interpretation element from a locally-saved interpretation resource pool at the terminal device according to the element identifiers in the element information and (ii) display the first target interpretation element when the terminal device displays the route planning result including at least two of the multiple routes and the second target interpretation element corresponding to the reason for recommending one of the at least two routes over the other routes.

12. The non-transitory computer-readable storage medium according to claim 11, wherein the target interpretation template is determined from an interpretation template comprised in a first interpretation template library, and the method further comprises:

obtaining a second interpretation template library and a template library digest corresponding to the second interpretation template library from an interpretation template library server;

calculating and obtaining a digest according to the second interpretation template library; and replacing the first interpretation template library with the second interpretation template library when verification succeeds based on the digest and the template library digest corresponding to the second interpretation template library.

13. The non-transitory computer-readable storage medium according to claim 12, wherein the method further comprises:
- determining a constituent unit of an interpretation element based on a type of the interpretation element;
- constructing a route interpretation protocol according to the constituent unit; and
- determining the original interpretation data and a first interpretation template library comprising the target interpretation template according to the route interpretation protocol.

14. The non-transitory computer-readable storage medium according to claim 13, wherein the target interpretation template comprises a constituent unit of an interpretation element, content of the interpretation element, a style value of the interpretation element and a priority of the interpretation element.

15. The non-transitory computer-readable storage medium according to claim 14, wherein the method further comprises:
- returning the route planning result to the terminal device, and saving a correspondence between a route planning identifier of the route planning result and the element information;
- obtaining an interpretation service request transmitted by the terminal device, the interpretation service request comprising the route planning identifier; and
- retrieving the element information corresponding to the route planning identifier according to the correspondence and performing operations of transmitting the element information to the terminal device.

* * * * *